(12) United States Patent
Naruse et al.

(10) Patent No.: US 10,180,491 B2
(45) Date of Patent: Jan. 15, 2019

(54) OBJECT DETECTION DEVICE

(71) Applicant: Panasonic Intellectual Property Management Co., Ltd., Osaka (JP)

(72) Inventors: Hayato Naruse, Shiga (JP); Akitoshi Ueda, Mie (JP); Shogo Sagara, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 285 days.

(21) Appl. No.: 15/111,796

(22) PCT Filed: Jan. 15, 2015

(86) PCT No.: PCT/JP2015/000149
§ 371 (c)(1),
(2) Date: Jul. 14, 2016

(87) PCT Pub. No.: WO2015/118804
PCT Pub. Date: Aug. 13, 2015

(65) Prior Publication Data
US 2016/0334505 A1    Nov. 17, 2016

(30) Foreign Application Priority Data

Feb. 5, 2014    (JP) .................. 2014-020686

(51) Int. Cl.
*G01S 7/40* (2006.01)
*G01S 7/52* (2006.01)
(Continued)

(52) U.S. Cl.
CPC ........ *G01S 7/4026* (2013.01); *G01S 7/52004* (2013.01); *G01S 13/931* (2013.01);
(Continued)

(58) Field of Classification Search
CPC ........ G01S 7/40; G01S 7/4004; G01S 7/4008; G01S 7/4021; G01S 7/4026;
(Continued)

(56) References Cited

U.S. PATENT DOCUMENTS 6,026,353 A * 2/2000 Winner ................. G01S 7/4026
                                                     342/70
6,087,975 A    7/2000 Sugimoto et al.
(Continued)

FOREIGN PATENT DOCUMENTS

DE   102015220576 A1   4/2016
EP      1803612 A1     7/2007
(Continued)

OTHER PUBLICATIONS

International Search Report of PCT application No. PCT/JP2015/000149 dated Apr. 21, 2015.
(Continued)

*Primary Examiner* — Peter M Bythrow
(74) *Attorney, Agent, or Firm* — Greenblum & Bernstein, P.L.C.

(57) ABSTRACT

An object detection device mounted on a vehicle includes a transmitter, a receiver, a measurement unit, and a determination unit. The transmitter intermittently transmits a signal wave to space around the vehicle. The receiver receives a reflected wave from an object. The measurement unit measures a distance to the object based on the reflected wave received by the receiver. The determination unit determines that the object is abnormally close to the vehicle if the distance measured by the measurement unit is within a determination distance range, counts the number of determinations that the object is abnormally close to the vehicle,
(Continued)

and determines that at least one of the transmitter or the receiver malfunctions if the number of determinations reaches a threshold.

11 Claims, 4 Drawing Sheets

(51) Int. Cl.
    *G08G 1/16*     (2006.01)
    *G01S 13/93*     (2006.01)
    *G01S 15/02*     (2006.01)
    *G01S 15/93*     (2006.01)
    *G01S 7/521*     (2006.01)

(52) U.S. Cl.
    CPC .......... *G01S 15/025* (2013.01); *G01S 15/931* (2013.01); *G08G 1/166* (2013.01); *G01S 7/521* (2013.01); *G01S 2007/4034* (2013.01); *G01S 2007/52012* (2013.01); *G01S 2013/9378* (2013.01); *G01S 2013/9385* (2013.01); *G01S 2015/938* (2013.01)

(58) Field of Classification Search
    CPC ....... G01S 2007/403; G01S 2007/4034; G01S 2007/4039; G01S 7/41; G01S 7/411; G01S 7/412; G01S 13/931
    See application file for complete search history.

(56) References Cited

U.S. PATENT DOCUMENTS

| | | | | |
|---|---|---|---|---|
| 6,124,823 A * | 9/2000 | Tokoro | ................. | G01S 7/2927 342/128 |
| 6,246,949 B1 * | 6/2001 | Shirai | ................. | B60K 31/0008 342/70 |
| 7,061,424 B2 * | 6/2006 | Kuroda | ................. | G01S 7/4026 342/118 |
| 8,711,031 B2 * | 4/2014 | Jeong | .................... | G01S 13/931 342/70 |
| 2002/0189875 A1 * | 12/2002 | Asanuma | .............. | G01S 7/4026 180/169 |
| 2005/0261573 A1 * | 11/2005 | Satoh | ................... | G06K 9/3208 600/415 |
| 2007/0146196 A1 | 6/2007 | Oka et al. | | |
| 2008/0042894 A1 | 2/2008 | Kikuchi | | |
| 2008/0201033 A1 * | 8/2008 | DeMersseman | ....... | G01B 21/24 701/30.5 |
| 2011/0156955 A1 * | 6/2011 | Jeong | .................... | G01S 13/931 342/359 |
| 2012/0290169 A1 * | 11/2012 | Zeng | .................... | G01S 7/4026 701/30.2 |
| 2013/0154870 A1 * | 6/2013 | Mills | ................... | G01S 13/931 342/70 |
| 2013/0218398 A1 * | 8/2013 | Gandhi | .................. | B60R 16/02 701/31.1 |
| 2016/0116588 A1 * | 4/2016 | Fukuman | ............ | G01S 7/52001 367/89 |

FOREIGN PATENT DOCUMENTS

| | | |
|---|---|---|
| JP | 11-014747 | 1/1999 |
| JP | 2004-085258 | 3/2004 |
| JP | 2007-178183 | 7/2007 |
| JP | 2008-040646 | 2/2008 |
| JP | 2011-002346 | 1/2011 |

OTHER PUBLICATIONS

The Extended European Search Report dated Feb. 8, 2017 for the related European Patent Application No. 15746491.8.

\* cited by examiner

US 10,180,491 B2

OBJECT DETECTION DEVICE

TECHNICAL FIELD

The present disclosure relates to an object detection device that detects an object based on a reflected wave obtained by emitting a signal wave such as an ultrasonic wave or an electromagnetic wave.

BACKGROUND ART

A radar device, which is an example of a conventional object detection device, transmits an electromagnetic wave forward of a vehicle and performs signal processing on a reflected wave from an obstruction (object) located forward of the vehicle to detect the presence of the obstruction and measure a distance to the obstruction (see, for example, Patent Literature 1). This radar device includes a radar tilt detection means and a vehicle tilt detection means. The radar tilt detection means detects a tilt of the radar device with respect to a direction perpendicular to a running surface of the vehicle. The vehicle tilt detection means detects a tilt of the vehicle with respect to the direction perpendicular to the running surface. If a relationship between the tilt of the radar device detected by the radar tilt detection means and the tilt of the vehicle detected by the vehicle tilt detection means is shifted from an initial relationship, the radar device determines that an off-axis of the radar device occurs in the perpendicular direction.

CITATION LIST

Patent Literature

PTL 1: Japanese Patent Unexamined Publication No. 2004-85258

SUMMARY OF THE INVENTION

The present disclosure provides an object detection device that can detect a malfunction in a transmitter or a receiver with a simple configuration.

An object detection device according to the present disclosure is mounted on a vehicle. The object detection device includes a transmitter, a receiver, a measurement unit, and a determination unit. The transmitter intermittently transmits a signal wave to space around the vehicle. The receiver receives a reflected wave from an object. The measurement unit measures a distance to the object based on the reflected wave received by the receiver. The determination unit determines that the object is abnormally close to the vehicle if the distance measured by the measurement unit is within a determination distance range, counts the number of determinations that the object is abnormally close to the vehicle, and determines that at least one of the transmitter or the receiver malfunctions if the number of determinations reaches a threshold.

It is supposed that while the vehicle is travelling, there is a low possibility that an object is consecutively determined to be abnormally close to the vehicle. In this configuration, the determination unit counts the number of determinations that an object is abnormally close to the vehicle, and if the number of determinations reaches a predetermined threshold (determination number), the determination unit determines that at least one of the transmitter or the receiver malfunctions. Thus, a sensor for detecting a malfunction of at least one of the transmitter or the receiver does not need to be provided in addition to the transmitter and the receiver, and a malfunction of the transmitter and the receiver can be detected with a simple configuration.

DESCRIPTION OF EMBODIMENT

Prior to description of an embodiment of the present disclosure, problems in a conventional object detection device will be described. The radar device disclosed in Patent Literature 1 includes the radar tilt detection means and the vehicle tilt detection means in order to detect an off-axis of the radar device (e.g., the transmitter and the receiver). Thus, the radar device has a complicated configuration, leading to an increase in costs.

Hereinafter, an example in which an obstruction detection device 1 for detecting an obstruction near a vehicle is used as an object detection device according to an embodiment of the present disclosure will be described with reference to the drawings. Obstruction detection device 1 is not limited to devices for detecting an obstruction near an automobile, but is applicable to any vehicle running on the ground, such as motorcycles, railway vehicles, and full-track vehicles. The object detection device may detect an object (including a human) that is not an obstruction.

Figure 1:
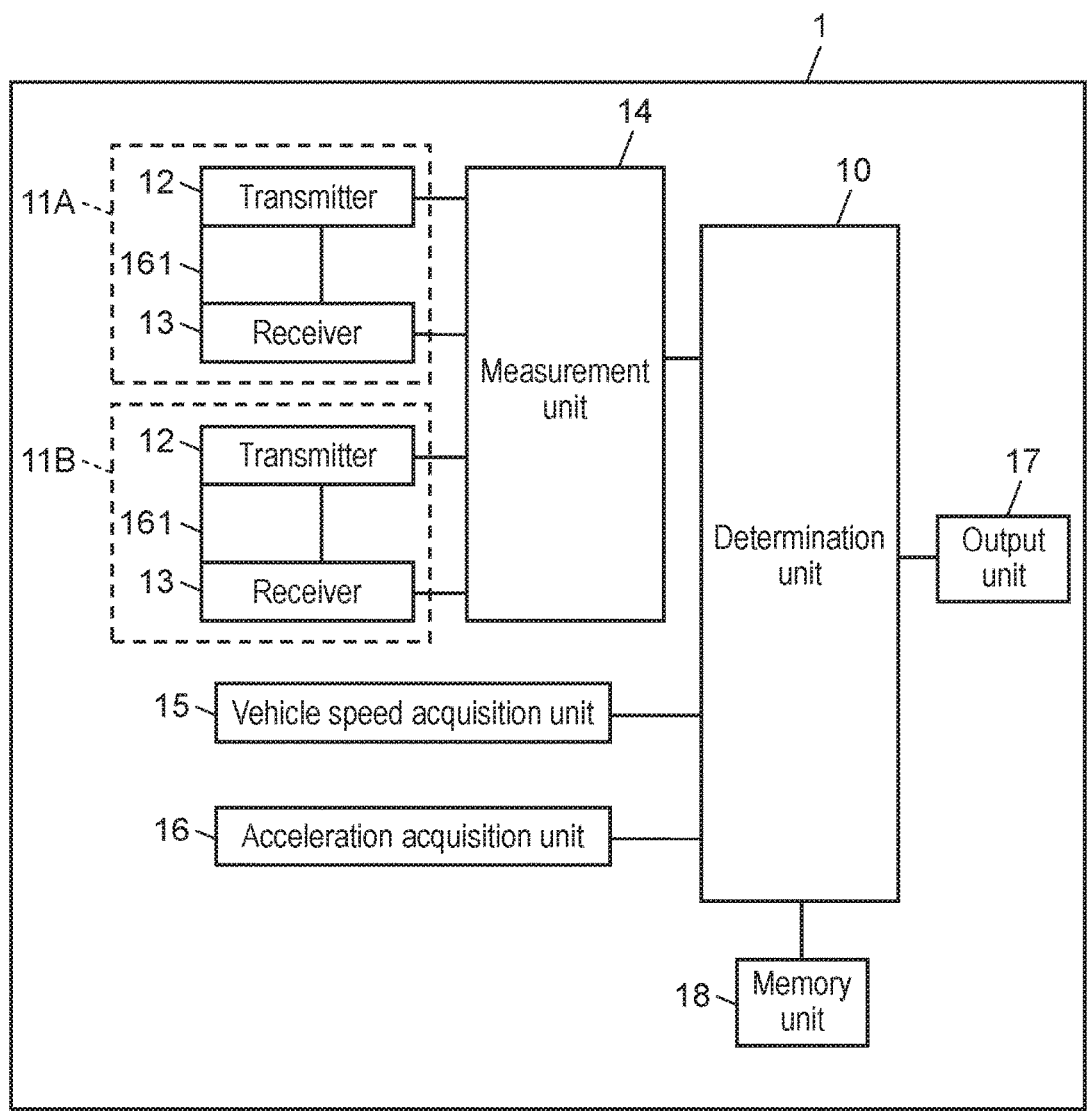
FIG. 1 is a block diagram illustrating an obstruction detection device that is an object detection device according to an embodiment of the present disclosure.
Figure 2:
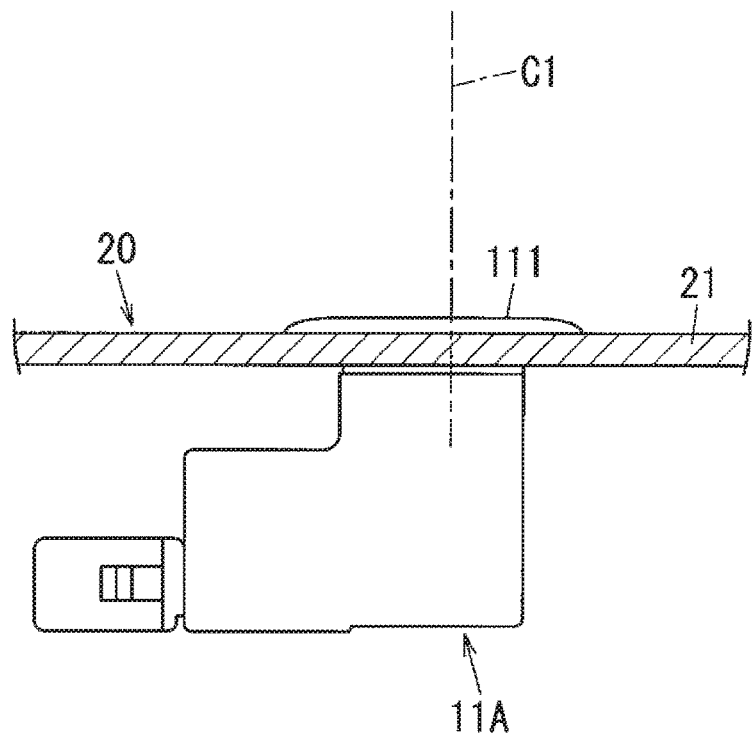
FIG. 2 is a cross-sectional view illustrating a state in which a transceiver illustrated in FIG. 1 is attached to a vehicle.
Figure 3:
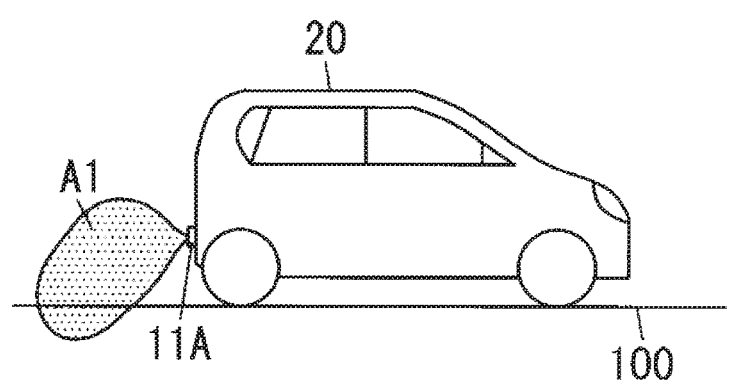
FIG. 3 illustrates a state in which the vehicle including the obstruction detection device illustrated in FIG. 1 travels on a flat road.

FIG. 1 is a block diagram illustrating obstruction detection device (object detection device) 1 according to an embodiment of the present disclosure. FIG. 2 illustrates a state in which a transceiver 11A is attached to a rear bumper 21. FIG. 3 is an outline view of a vehicle 20 to which obstruction detection device 1 is mounted.

Obstruction detection device 1 includes a determination unit 10, transceivers 11A and 11B, and a measurement unit 14. Each of transceivers 11A and 11B includes a transmitter 12 and a receiver 13. Transmitter 12 intermittently transmits a signal wave to space around vehicle 20. Receiver 13 receives a reflected wave generated by reflection of the signal wave on an object. Measurement unit 14 measures a distance to the object based on the reflected wave received by receiver 13. In addition to the components described above, obstruction detection device 1 may further include a vehicle speed acquisition unit 15, an acceleration acquisition unit 16, an output unit 17, and a memory unit 18.

Transceivers 11A and 11B are attached to an external part of vehicle 20, for example, attached respectively to the left and right of a rear bumper 21 illustrated in FIG. 3. More specifically, as illustrated in FIG. 2, transceiver 11A is attached to the reverse side of rear bumper 21 with an input/output face 111 exposed at the front side of rear bumper 21. Transceiver 11B is attached to rear bumper 21 in a manner similar to that of transceiver 11A, and thus, description thereof will not be repeated. The locations to which transceivers 11A and 11B are attached are not limited to rear bumper 21, and transceivers 11A and 11B may be attached to a front bumper 22. That is, transceivers 11A and 11B only need to be attached to locations corresponding to detection areas of an obstruction. Although input/output face 111 projects outward of vehicle 20 from the surface of rear bumper 21 in FIG. 2, input/output face 111 may be substantially flush with rear bumper 21.

As described above, each of transceivers 11A and 11B includes transmitter 12 and receiver 13. Transceiver 11A is attached to, for example, a right portion of rear bumper 21 to monitor an obstruction in a detection area at the right rear of vehicle 20. Transceiver 11B is attached to, for example, a left portion of rear bumper 21 to monitor an obstruction in a detection area at the left rear of vehicle 20. The detection area of transceiver 11A and the detection area of transceiver 11B at least partially overlap each other. Although a blind spot is formed near the boundary between the detection area of transceiver 11A and the detection area of transceiver 11B, the configuration described above can reduce the size of the blind spot.

Transmitter 12 includes, for example, an ultrasonic oscillator (not shown) that expands and contracts upon application of a voltage, such as a piezoelectric element. The surface of transmitter 12 from which an ultrasonic wave is emitted is disposed at input/output face 111 (see FIG. 2) exposed at the front side of rear bumper 21. Upon an input of a transmitted signal from measurement unit 14, transmitter 12 causes the ultrasonic oscillator to oscillate for a predetermined pulse duration time, and a pulsed ultrasonic wave is transmitted from input/output face 111 along a beam axis C1.

Receiver 13 includes, for example, an ultrasonic transducer (not shown), such as a piezoelectric element, that generates a voltage upon application of vibrations from the outside. The surface of receiver 13 to which an ultrasonic wave is input is also disposed on input/output face 111 illustrated in the FIG. 2. When an ultrasonic wave (reflected wave from an obstruction) is input to input/output face 111, receiver 13 converts the ultrasonic wave input to input/output face 111 to an electrical signal and amplifies the signal, then, shapes the waveform of the signal, and outputs the resulting signal to measurement unit 14 as a received signal.

Transceivers 11A and 11B transmit ultrasonic waves to the space in order to detect an obstruction. However, waves to be transmitted to the space are not limited to ultrasonic waves (sound waves), and may be electromagnetic waves. In each of transceivers 11A and 11B, transmitters 12 and receivers 13 individually include ultrasonic oscillators, but transmitter 12 and receiver 13 may share one ultrasonic oscillator. In this case, the ultrasonic oscillator shared by transmitter 12 and receiver 13 transmits an ultrasonic wave from input/output face 111, and an ultrasonic wave input to input/output face 111 is converted to an electrical signal. Although the two pairs of transceivers 11A and 11B are provided on rear bumper 21, the number of transceivers may be one or three or more.

Measurement unit 14 drives transceivers 11A and 11B independently of each other so that transceivers 11A and 11B individually transmit ultrasonic waves. Based on the signals from transceivers 11A and 11B, measurement unit 14 determines the presence of an obstruction and measures a distance to the obstruction in detection areas of transceivers 11A and 11B.

A configuration for allowing measurement unit 14 to drive transceiver 11A to determine the presence of an obstruction and measure a distance to the obstruction will now be described. Measurement unit 14 outputs a transmitted signal to transmitter 12 in each of transceivers 11A and 11B in predetermined cycles. In response to the transmitted signal, transmitter 12 transmits a pulsed ultrasonic wave in predetermined cycles. After an output of the transmitted signal to transmitter 12, when the received signal is input from receiver 13 to measurement unit 14, measurement unit 14 measures a duration of time from the output of the transmitted signal to the input of the received signal. That is, measurement unit 14 obtains a propagation time necessary for a round trip of an ultrasonic wave between an obstruction and each of transceivers 11A and 11B. Based on the propagation times and a speed of sound, measurement unit 14 obtains a distance to the obstruction in each of the detection areas of transceivers 11A and 11B, and outputs the distances to determination unit 10.

Memory unit 18 includes, for example, an electrically erasable and programmable read only memory (EEPROM). Memory unit 18 previously registers a determination distance range for determining whether the obstruction is abnormally close to the vehicle or not. The determination distance range is set at 80 cm±20 cm. The determination distance range may be set at a predetermined distance or less. For example, the determination distance range may be set at 80 cm or less.

Memory unit 18 previously registers a first reference number of times as a reference for determination of abnormally close approach. The first reference number of times is, for example, several times, that is, a predetermined number of one or more and less than ten. Memory unit 18 also previously registers a second reference number of times as a reference for determining whether a malfunction occurs in transceivers 11A and 11B or not. The second reference number of times is a threshold for determining that at least one of transmitter 12 or receiver 13 malfunctions. The second reference number of times is, for example, several tens. In the following description, the second reference number of times is 75.

Determination unit 10 includes, for example, a microcomputer, and determines whether an obstruction is abnormally close to the vehicle or not and whether a malfunction occurs in transceivers 11A and 11B or not based on a measured value of a distance input from measurement unit 14. As described above, measurement unit 14 obtains a distance to an obstruction detected by transceiver 11A and a distance to an obstruction detected by transceiver 11B separately, and outputs the obtained distances to determination unit 10. Based on the distance to the obstruction detected by transceiver 11A, determination unit 10 determines whether the obstruction detected by transceiver 11A is abnormally close to the vehicle or not and whether transceiver 11A malfunctions or not. Based on the distance to the obstruction detected by transceiver 11B, determination unit 10 determines whether the obstruction detected by transceiver 11B is abnormally close to the vehicle or not and whether transceiver 11B malfunctions or not. That is, if the distance measured by measurement unit 14 is within a predetermined range, that is, within the determination distance range, determination unit 10 determines that an object is abnormally close to the vehicle. Determination unit 10 counts the number of determinations that an object is abnormally close to the vehicle. When this number of determinations reaches a threshold, it is determined that at least one of transmitter 12 or receiver 13 malfunctions.

When determination unit 10 determines that an obstruction is abnormally close to the vehicle in the detection area of at least one of transceivers 11A and 11B, determination unit 10 outputs a signal indicating abnormally close approach of an obstruction to output unit 17. When determination unit 10 detects a malfunction of transceiver 11A or 11B, determination unit 10 outputs a signal indicating an occurrence of a malfunction to output unit 17.

Vehicle speed acquisition unit 15 acquires vehicle speed information from a controller (not shown) provided in, for example, vehicle 20, and outputs the vehicle speed information to determination unit 10.

Acceleration acquisition unit 16 includes a three-dimensional acceleration sensor (hereinafter referred to as an acceleration sensor) 161 integrally provided in each of transceivers 11A and 11B. Acceleration sensor 161 detects a tilt of a corresponding one of transceivers 11A and 11B with respect to a gravity direction. Acceleration acquisition unit 16 outputs a detection result of the tilt to determination unit 10. That is, acceleration acquisition unit 16 outputs tilt information with respect to the vertical direction of vehicle 20 to determination unit 10. Acceleration acquisition unit 16 may be connected to a three-dimensional acceleration sensor (not shown) provided in vehicle 20 to acquire tilt information with respect to the vertical direction of vehicle 20 from this acceleration sensor.

When output unit 17 receives a signal indicating abnormally close approach of an obstruction or a signal indicating a malfunction of transceiver 11A or 11B from determination unit 10, output unit 17 outputs these signals to the controller described above provided in vehicle 20. When the controller receives a signal indicating abnormally close approach of an obstruction from output unit 17, the controller notifies a passenger in vehicle 20 of abnormally close approach of the obstruction by using sound, a sign, and/or light, etc. When the controller receives a signal indicating a malfunction of transceiver 11A or 11B, from output unit 17, the controller notifies the passenger in vehicle 20 of the malfunction of transceiver 11A or 11B by using sound, a sign, and/or light, etc. suggest measures against the malfunction to the passenger.

Next, an operation of obstruction detection device 1 will be described. Measurement unit 14 outputs a transmitted signal to transmitter 12 in each of transceivers 11A and 11B in predetermined cycles. When transmitter 12 receives the transmitted signal from measurement unit 14, transmitter 12 transmits a pulsed ultrasonic wave from input/output face 111 to space around vehicle 20. When the ultrasonic wave from transmitter 12 reaches an obstruction near vehicle 20, the ultrasonic wave is reflected on the obstruction.

When this reflected wave is input to input/output face 111, receiver 13 of each of transceivers 11A and 11B converts the ultrasonic wave to an electrical signal, amplifies the electrical signal, shapes the waveform of the signal, and outputs the resulting signal to measurement unit 14.

When measurement unit 14 receives a received signal from transceiver 11A after outputting the transmitted signal to transceiver 11A, measurement unit 14 obtains a distance to the obstruction detected by transceiver 11A, and outputs a measured value of the distance to determination unit 10. Similarly, when measurement unit 14 receives a received signal from transceiver 11B after outputting the transmitted signal to transceiver 11B, measurement unit 14 obtains a distance to the obstruction detected by transceiver 11B, and outputs a measured value of the distance to determination unit 10.

Determination unit 10 determines whether an obstruction is abnormally close to the vehicle or not and whether a malfunction occurs in transceivers 11A and 11B or not when receiving the measured values of the distance from measurement unit 14. The following description is directed to operations of determination unit 10 in determining whether an obstruction is abnormally close to the vehicle and whether transceiver 11A malfunctions, based on the distance to the obstruction detected by transceiver 11A. Operations of determination unit 10 in determining whether an obstruction is abnormally close to the vehicle and whether transceiver 11B malfunctions based on the distance to the obstruction detected by transceiver 11B are similar to those of transceiver 11A, and thus, the operations of transceiver 11B are not repeatedly described.

When determination unit 10 receives the measured value of the distance to the obstruction detected by transceiver 11A from measurement unit 14, determination unit 10 determines whether the measured value of the distance is within a determination distance range read out from memory unit 18 or not.

If the measured value of the distance is within the determination distance range, determination unit 10 determines that the obstruction is abnormally close to the vehicle, and counts the number of determinations that the obstruction is abnormally close to the vehicle (where this number will be hereinafter referred to as an abnormally close approach determination number). That is, the abnormally close approach determination number is incremented by one, for example. The abnormally close approach determination number is counted for each of transceivers 11A and 11B. The abnormally close approach determination number is set at zero in an initial stage or a reset stage, but when the engine of vehicle 20 stops, the abnormally close approach determination number is maintained.

If an obstruction is consecutively determined to be abnormally close to the vehicle at a first reference number of times read out from memory unit 18 or more, determination unit 10 confirms that the obstruction is abnormally close to the vehicle, and outputs a signal indicating abnormally close approach of the obstruction to output unit 17.

Then, determination unit 10 compares the abnormally close approach determination number and a second reference number of times read out from memory unit 18. If the abnormally close approach determination number is the second reference number of times or more, determination unit 10 determines that a malfunction that causes consecutive determinations of abnormally close approach of the obstruction occurs in transceiver 11A. Then, determination unit 10 outputs a signal indicating a malfunction of transceiver 11A to output unit 17. In this embodiment, determination unit 10 determines, as a malfunction, a state in which a transmission direction (beam axis C1) in which transceiver 11A transmits a signal wave is shifted from a predetermined transmission direction by a predetermined angle (e.g., 45° downward) or more.

When output unit 17 receives a signal indicating abnormally close approach of an obstruction or a signal indicating a malfunction of transceiver 11A or 11B from determination unit 10, output unit 17 notifies a passenger in vehicle 20 of the abnormally close approach or the malfunction.

If each of transceivers 11A and 11B is attached to vehicle 20 with beam axis C1 of an ultrasonic wave being oriented in a predetermined transmission direction, the detection areas of an obstruction are located above the road surface, and an ultrasonic wave reflected on the road surface is not input to any of transceivers 11A and 11B.

However, if a bumper deforms because of collision of vehicle 20 with an obstruction or other objects or vehicle 20 suffers from a mistake in production, beam axis C1 along which obstruction detection device 1 transmits an ultrasonic wave is shifted downward from the predetermined transmission direction. In such a case, as illustrated in FIG. 3, detection area A1 of an obstruction faces downward so that detection area A1 might overlap road 100. Then, an ultrasonic wave reflected on road 100 is input to transceivers 11A and 11B. Consequently, determination unit 10 might erroneously determine that the obstruction is abnormally close to the vehicle because a distance measured based on the reflected wave from road 100 is within the determination distance range.

In this manner, in a case where beam axis C1 faces downward so that determination unit 10 erroneously determines that the obstruction is abnormally close to the vehicle, erroneous detection of abnormally close approach continues. Thus, the abnormally close approach determination number will reach the second reference number of times soon. When the abnormally close approach determination number reaches the second reference number of times or more, determination unit 10 determines that a malfunction occurs in transceivers 11A and 11B. In this manner, a sensor for detecting a malfunction of transceivers 11A and 11B does not need to be additionally provided, and a malfunction of transceivers 11A and 11B can be detected with a simple configuration. Then, output unit 17 notifies a passenger in the malfunction of transceivers 11A and 11B based on the signal from determination unit 10 to thereby suggest measures against the malfunction of transceivers 11A and 11B to the passenger.

Determination unit 10 may increment the abnormally close approach determination number by one, for example, only in a case where the vehicle speed acquired by vehicle speed acquisition unit 15 is out of a predetermined speed range and determination unit 10 determines that an obstruction is abnormally close to the vehicle. In this case, even if determination unit 10 determines that the obstruction is abnormally close to the vehicle in a state where the vehicle speed is within the predetermined speed range, determination unit 10 does not count the abnormally close approach determination number, and keeps the abnormally close approach determination number at the same number. The predetermined speed range herein is a speed range in a case where vehicle 20 runs at a reduced speed for parking in a garage or parking or stopping, and is set at a speed range of, for example, 10 km or less per an hour. In a case where vehicle 20 runs at a speed lower than a predetermined speed or is stopped or parked, an object near vehicle 20 is continuously detected for a long period. In view of this, determination unit 10 preferably does not count the abnormally close approach determination number in a case where the vehicle speed is within the predetermined speed range and it is determined that an obstruction is abnormally close to the vehicle. By performing such determination, the state in which abnormally close approach of an obstruction is detected for a long period is not likely to be erroneously detected as a malfunction of transceivers 11A and 11B. Determination unit 10 may acquire information on a switching position of a transmission from a controller of vehicle 20. Then, in a case where the transmission is set at a parking position, the determination of determination unit 10 may be configured in such a manner that even when it is determined that an obstruction is abnormally close to the vehicle, the abnormally close approach determination number is kept.

Determination unit 10 may reset the abnormally close approach determination number if a non-detection state in which it is not detected that an obstruction is abnormally close to the vehicle continues for a time longer than or equal to a travel time in which vehicle 20 travels a distance corresponding to the total length of vehicle 20 at the vehicle speed acquired by vehicle speed acquisition unit 15. If the duration time of the non-detection unit is less than the travel time, determination unit 10 may keep the abnormally close approach determination number. Here, suppose the total length of the vehicle is L1 and the vehicle speed acquired by vehicle speed acquisition unit 15 is V1, a travel time T1 can be obtained by T1=L1/V1. For example, in a case where total length L1 of vehicle 20 is 3400 mm and a vehicle speed V1 is 5 km per an hour, travel time T1 is 2.4 seconds. If the non-detection state continues for 2.4 seconds or more, the abnormally close approach determination number is reset. If the non-detection state continues for less than 2.4 seconds, the abnormally close approach determination number is kept.

As described above, in vehicle 20 illustrated in FIG. 3, transceivers 11A and 11B are attached with the transmission direction tilted downward in such a manner that detection area A1 interferes with the surface of road 100. Then, a case where vehicle 20 in such a state travels on road 100 in which a flat road 101 is located ahead of an ascending road 102 will be described with reference to FIGS. 4A and 4B.

In a case where vehicle 20 is on ascending road 102 or flat road 101, vehicle 20 keeps a constant angle with respect to the road surface. Thus, in the case where vehicle 20 travels on ascending road 102 or flat road 101, detection area A1 overlaps the road surface so that a reflected wave from the road surface is input to transceivers 11A and 11B. Accordingly, determination unit 10 erroneously detects abnormally close approach of an obstruction.

Figure 4A:
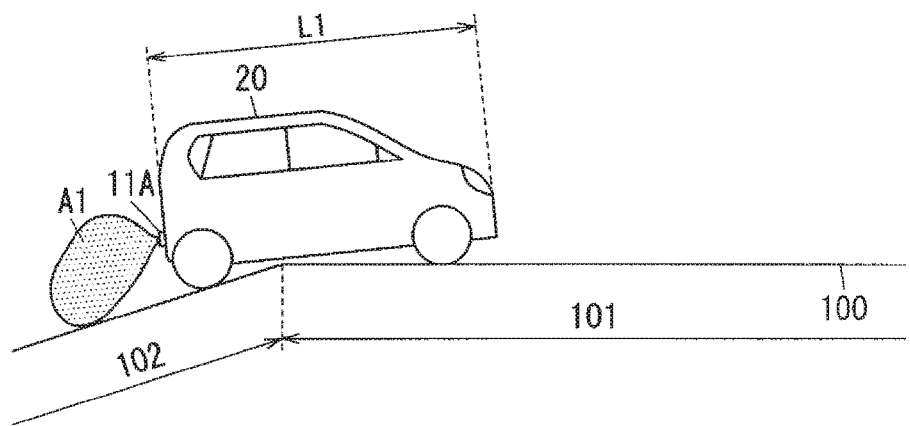
FIG. 4A illustrates a state before the vehicle illustrated in FIG. 3 reaches the top of an ascending road.
Figure 4B:
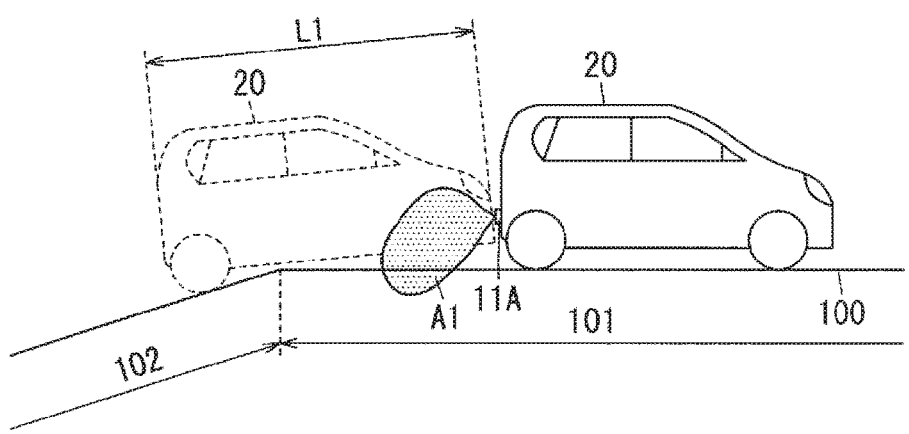
FIG. 4B illustrates a state after the vehicle illustrated in FIG. 3 has reached the top of the ascending road.

FIG. 4A illustrates a state in which vehicle 20 reaches the boundary between ascending road 102 and flat road 101, front wheels of vehicle 20 are on flat road 101, and rear wheels are on ascending road 102. In this state, a rear portion of vehicle 20 is tilted obliquely upward with respect to ascending road 102. In this case, detection area A1 is located above the road surface so that determination unit 10 can overcome erroneous detection of the road surface. When vehicle 20 travels forward after the rear wheels have passed over horizontal flat road 101, detection area A1 overlaps the road surface, as illustrated in FIG. 4B. In a period from the state illustrated in FIG. 4A to the state illustrated in FIG. 4B, detection area A1 is located above the road surface so that determination unit 10 can overcome erroneous detection of the road surface. That is, the non-detection state is supposed to continue for about travel time T1 in which vehicle 20 travels a distance corresponding to total length L1 at vehicle speed V1 acquired by vehicle speed acquisition unit 15.

Next, a case where vehicle 20 illustrated in FIG. 3 travels on a road 100 in which descending road 103 is located ahead of flat road 101 will be described with reference to FIGS. 5A and 5B.

In a case where vehicle 20 is on flat road 101 or descending road 103, vehicle 20 keeps a constant angle with respect to the road surface. Thus, in the case where vehicle 20 travels on flat road 101 or descending road 103, detection area A1 overlaps the road surface so that a reflected wave from the road surface is input to transceivers 11A and 11B. Accordingly, determination unit 10 erroneously detects abnormally close approach of an obstruction.

Figure 5A:
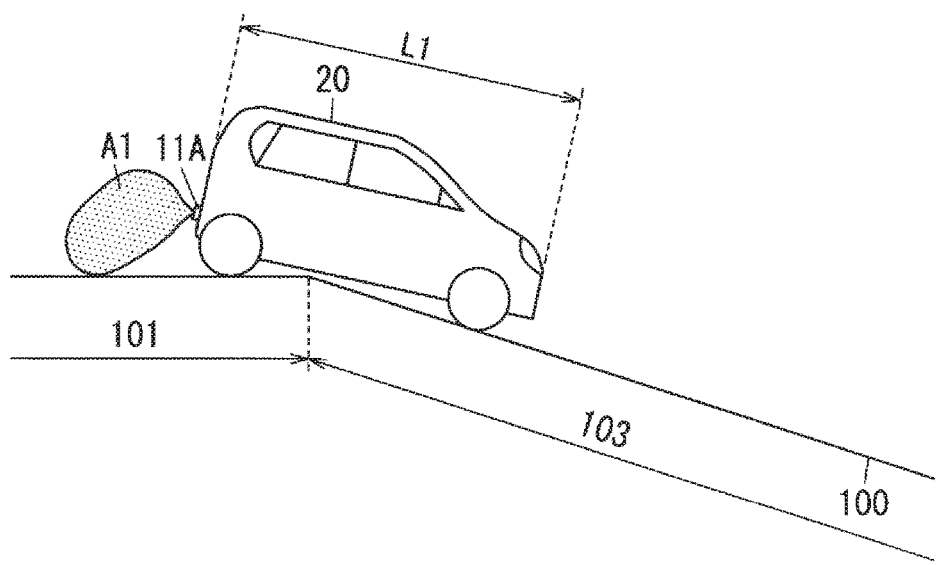
FIG. 5A illustrates a state just before the vehicle illustrated in FIG. 3 enters a descending road.
Figure 5B:
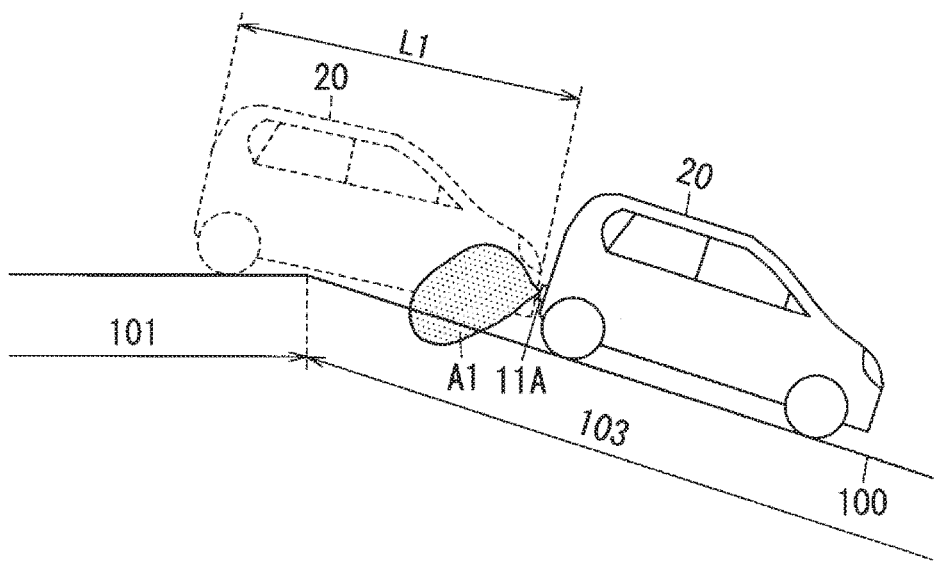
FIG. 5B illustrates a state in which the vehicle illustrated in FIG. 3 has entered the descending road.

FIG. 5A illustrates a state in which vehicle 20 reaches the boundary between flat road 101 and descending road 103, front wheels of vehicle 20 are on descending road 103, and rear wheels are on flat road 101. In this state, a rear portion of vehicle 20 is tilted obliquely upward with respect to flat road 101. In this case, detection area A1 is located above the road surface so that determination unit 10 can overcome erroneous detection of the road surface. When vehicle 20 travels forward after the rear wheels have passed over descending road 103, detection area A1 overlaps the road surface, as illustrated in FIG. 5B. In a period from the state illustrated in FIG. 5A to the state illustrated in FIG. 5B, detection area A1 is located above the road surface so that determination unit 10 can overcome erroneous detection of the road surface. This non-detection state is also supposed to continue for about travel time T1.

As described above, it is supposed that in a case where beam axis C1 along which an ultrasonic wave is transmitted is tilted downward with respect to a predetermined transmission direction, the non-detection state of an obstruction continues for about travel time T1 in some cases depending on the state of the road on which vehicle 20 travels.

In view of this, determination unit 10 preferably keeps the abnormally close approach determination number if the duration of the non-detection state in which it is not determined that an obstruction is abnormally close to the vehicle is less than travel time T1. In this manner, in the case where vehicle 20 travels on ascending road 102 or descending road 103, even when determination unit 10 is temporarily in the non-detection state in which an obstruction is not detected, determination unit 10 can keep the abnormally close approach determination number. Thus, when determination unit 10 detects abnormally close approach of an obstruction, determination unit 10 can restart counting of the abnormally close approach determination number to determine a malfunction of transceivers 11A and 11B in an early stage.

If the non-detection state in which an obstruction is not determined to be abnormally close to the vehicle continues for travel time T1 or more, determination unit 10 preferably resets the abnormally close approach determination number. In a case where vehicle 20 travels on a boundary area between ascending road 102 and flat road 101 or a boundary area between flat road 101 and descending road 103, it is also supposed that vehicle 20 passes over the boundary area after a lapse of travel time T1. Thus, if the non-detection state continues for travel time T1 or more, it is determined that transceivers 11A and 11B are mounted on vehicle 20 with detection areas A1 not overlapping the road surface. Therefore, if the non-detection state in which it is not determined that an obstruction is abnormally close to the vehicle continues for travel time T1 or more, determination unit 10 resets the abnormally close approach determination number to reduce the possibility of erroneous detection of a malfunction of transceivers 11A and 11B.

As described above, determination unit 10 determines, as a malfunction of transceivers 11A and 11B, a state in which the transmission direction in which each of transceivers 11A and 11B transmits a signal wave is shifted from the predetermined transmission direction by the predetermined angle or more. With this detection, the state in which the transmission direction in which each of transceivers 11A and 11B transmits a signal wave is shifted from the predetermined transmission direction by the predetermined angle or more can be detected with a simple configuration without addition of another sensor.

Determination unit 10 may increment the abnormally close approach determination number by one by using tilt information of vehicle 20 acquired by acceleration acquisition unit 16 only in a case where the tilt of vehicle 20 is the predetermined angle or less and determination unit 10 determines that an object is abnormally close to the vehicle. The tilt information is information on a tilt angle with respect to the vertical direction. If the tilt of vehicle 20 on which transceivers 11A and 11B are mounted exceeds a predetermined angle, obstruction detection device 1 might fail to detect an object correctly. Determination unit 10 only needs to increment the abnormally close approach determination number by one, for example, only in a case where the tilt of vehicle 20 is the predetermined angle or less and determination unit 10 determines that an object is abnormally close to the vehicle. In this manner, the possibility of erroneous detection of a malfunction of transceivers 11A and 11B because of the tilt of vehicle 20 can be reduced.

Determination unit 10 may determine that a malfunction occurs in transceivers 11A and 11B if the malfunction detection number is the second reference number of times or more and the tilt angle of vehicle 20 acquired by acceleration acquisition unit 16 is within a predetermined range of angle. The predetermined range of angle is, for example, 20° or less. In this manner, in a case where detection area A1 overlaps the road surface so that the road surface is erroneously detected as an obstruction because of the tilt of vehicle 20, determination unit 10 is less likely to erroneously detect an obstruction as a malfunction of transceivers 11A and 11B, and thus, a malfunction of transceivers 11A and 11B can be accurately detected.

As described above, obstruction detection device 1 as an object detection device according to the present embodiment includes transmitter 12, receiver 13, measurement unit 14, and determination unit 10, and is mounted on vehicle 20. Transmitter 12 intermittently transmits a signal wave to space around vehicle 20. Receiver 13 receives a reflected wave generated by reflection of the signal wave on an object. Measurement unit 14 measures a distance to an object based on the reflected wave received by receiver 13. If the distance measured by measurement unit 14 is within a predetermined distance range, determination unit 10 determines that an object is abnormally close to the vehicle. Determination unit 10 counts the number of determinations that an object is abnormally close to the vehicle (the abnormally close approach determination number), and when the number reaches a predetermined threshold (second reference number of times), determination unit 10 determines that at least one of transmitter 12 or receiver 13 malfunctions.

While vehicle 20 is travelling, the possibility that it is consecutively determined that an object is abnormally close to the vehicle is low. In the present embodiment, determination unit 10 counts the number of determinations that an object is abnormally close to the vehicle, and when the number reaches a predetermined threshold, determination unit 10 determines that at least one of transmitter 12 or receiver 13 malfunctions. Thus, a sensor does not need to be added in order to detect a malfunction of at least one of transmitter 12 or receiver 13, and the malfunction of transmitter 12 and receiver 13 can be detected with a simple configuration.

Obstruction detection device 1 preferably further includes vehicle speed acquisition unit 15 for acquiring a vehicle speed of vehicle 20. Determination unit 10 preferably increments the abnormally close approach determination number only if the vehicle speed acquired by vehicle speed acquisition unit 15 is out of a predetermined speed range and determination unit 10 determines that an object is abnormally close to the vehicle. In this manner, in a case where the vehicle travels at a speed within the predetermined speed range, even if the distance measured by measurement unit 14 decreases to a predetermined threshold or less, determination unit 10 does not count the number of determinations that an object is abnormally close to the vehicle. Thus, it is possible to reduce the possibility that in detecting an obstruction while the vehicle is stopped or parked, the number of determinations of abnormally close approach of an object exceeds a threshold to cause erroneous detection of a malfunction of transmitter 12 and/or receiver 13.

In the case where obstruction detection device 1 includes vehicle speed acquisition unit 15, determination unit 10 may reset the abnormally close approach determination number if a non-detection state in which it is not determined that the object is abnormally close to the vehicle continues for a period equal to or longer than predetermined travel time T1 or more. Travel time T1 refers to a time necessary for vehicle 20 to travel a distance corresponding to length L1 of vehicle 20 at vehicle speed V1 acquired by vehicle speed acquisition unit 15. If the non-detection state continues for predetermined travel time T1 or more, transmitter 12 and receiver 13 are determined to be mounted at correct positions of vehicle 20. Thus, by resetting the abnormally close approach determination number, the possibility of erroneous detection of a malfunction of transmitter 12 and/or receiver 13 can be reduced.

If the duration time of the non-detection unit is less than travel time T1, determination unit 10 preferably keeps the abnormally close approach determination number. Since the non-detection state can continue for about travel time T1 in some travelling situations of vehicle 20, if the duration time of the non-detection state is less than travel time T1, determination unit 10 keeps the abnormally close approach determination number. In this manner, when abnormally close approach of an obstruction is detected again, a malfunction of transmitter 12 and/or receiver 13 can be detected in an early stage.

Determination unit 10 may determine, as a malfunction of transmitter 12, a state in which the transmission direction in which transmitter 12 transmits a signal wave is shifted from the predetermined transmission direction by the predetermined angle or more. Thus, a state in which transmitter 12 is mounted on vehicle 20 with the transmission direction of a signal wave being shifted from the predetermined transmission direction by the predetermined angle or more can be detected without addition of a sensor. As a result, a malfunction of transmitter 12 can be detected with a simple configuration.

An acceleration acquisition unit 16 that outputs tilt information with respect to the vertical direction of vehicle 20 to determination unit 10 is preferably provided. Determination unit 10 preferably increments the abnormally close approach determination number by using the tilt information only if the tilt of vehicle 20 is at a predetermined angle or less and determination unit 10 determines that an object is abnormally close to the vehicle. If the tilt of vehicle 20 on which obstruction detection device 1 is mounted with respect to the vertical direction exceeds the predetermined angle, obstruction detection device 1 might fail to detect an object correctly. However, when determination unit 10 increments the abnormally close approach determination number under the conditions described above, it is possible to reduce the possibility of erroneous detection of a malfunction of transmitter 12 and/or receiver 13 because of the tilt of vehicle 20.

Acceleration acquisition unit 16 only needs to include acceleration sensor 161 provided in transmitter 12 or receiver 13, or to be connected to an acceleration sensor provided in vehicle 20.

REFERENCE MARKS IN THE DRAWINGS 1 obstruction detection device (object detection device)
10 determination unit
11A, 11B transceiver
12 transmitter
13 receiver
14 measurement unit
15 vehicle speed acquisition unit
16 acceleration acquisition unit
17 output unit
18 memory unit
20 vehicle
21 rear bumper
22 front bumper
100 road
101 flat road
102 ascending road
103 descending road
111 input/output face
161 acceleration sensor

The invention claimed is:

1. An object detection device mounted on a vehicle, the object detection device comprising:
   a transmitter that intermittently transmits a signal wave to space around the vehicle;
   a receiver that receives a reflected wave generated by reflection of the signal wave on an object;
   a measurement unit that measures a distance to the object based on the reflected wave;
   a vehicle speed acquisition unit that acquires a vehicle speed of the vehicle; and
   a determination unit that determines that the object is abnormally close to the vehicle when the distance measured by the measurement unit is within a predetermined distance range, counts a number of determinations that the object is abnormally close to the vehicle, and determines that at least one of the transmitter or the receiver is malfunctioning when the number of determinations reaches a threshold number,
   wherein the determination unit increments the number of determinations that the object is abnormally close to the vehicle only when the vehicle speed is out of a predetermined speed range.

2. The object detection device of claim 1, wherein the determination unit resets the number of determinations when a non-detection state in which it is not determined that the object is abnormally close to the vehicle continues for a period equal to or longer than a travel time in which the vehicle travels a distance corresponding to a total length of the vehicle at the vehicle speed.

3. The object detection device of claim 2, wherein the determination unit keeps the number of determinations when a duration time of the non-detection state is less than the travel time.

4. The object detection device of claim 1, wherein
   the determination unit determines at least one of the transmitter or the receiver is malfunctioning when a transmission direction in which the transmitter transmits the signal wave is shifted by at least a predetermined angle without providing an additional sensor for detecting the malfunction.

5. The object detection device of claim 1, further comprising:
an acceleration acquisition unit that outputs tilt information with respect to a vertical direction of the vehicle to the determination unit, wherein
the determination unit increments the number of determinations only when a tilt angle of the vehicle, included in the tilt information, is a predetermined angle or less.

6. The object detection device of claim 5, wherein the acceleration acquisition unit is connected to either a first acceleration sensor disposed in one of the transmitter or the receiver, or a second acceleration sensor disposed in the vehicle.

7. The object detection device of claim 1, wherein the predetermined speed range is a reduced speed for parking or stopping.

8. The object detection device of claim 7, wherein the predetermined speed range is less than 10 km per hour.

9. The object detection device of claim 1, wherein the transmitter includes an ultrasonic oscillator that intermittently transmits an ultrasonic wave as the signal wave.

10. The object detection device of claim 1, wherein, when a transmission direction in which the transmitter transmits the signal wave is shifted from a predetermined transmission direction by at least a predetermined angle and the vehicle speed is out of a predetermined speed range, the determination unit continuously determines that the object is abnormally close to the vehicle, continuously increments the number of determinations that the object is abnormally close to the vehicle, and determines that at least one of the transmitter or the receiver is malfunctioning.

11. An object detection device for a vehicle, the object detection device comprising:
a transmitter that intermittently transmits a signal wave to space around the vehicle;
a receiver that receives a reflected wave generated by reflection of the signal wave on an object; and
a computer that:
a distance measured from the vehicle to the object based on the reflected wave;
receives a vehicle speed of the vehicle; and
determines that the object is abnormally close to the vehicle when the distance is within a predetermined distance range, counts a number of determinations that the object is abnormally close to the vehicle, and determines that at least one of the transmitter or the receiver is malfunctioning when the number of determinations reaches a threshold number,
wherein the computer increments the number of determinations that the object is abnormally close to the vehicle only when the vehicle speed is out of a predetermined speed range.

* * * * *